United States Patent [19]

Steuck et al.

[11] Patent Number: 4,809,857
[45] Date of Patent: Mar. 7, 1989

[54] DRUM ROTATION INDICATOR

[75] Inventors: Roger A. Steuck, Nicholasville; Paul T. Culler, Lexington, both of Ky.; Kelly Drake, Fremont, Calif.

[73] Assignee: FMC Corporation, Chicago, Ill.

[21] Appl. No.: 83,124

[22] Filed: Aug. 10, 1987

[51] Int. Cl.$^4$ .............................................. B66D 1/40
[52] U.S. Cl. .................................... 212/153; 212/157; 212/165; 250/231 SE; 340/407; 340/685
[58] Field of Search ....................... 212/153, 165, 157; 324/175; 250/231 SE; 340/407, 670, 685, 964

[56] References Cited

U.S. PATENT DOCUMENTS

| | | | |
|---|---|---|---|
| 2,130,296 | 9/1938 | Caldwell | 340/670 |
| 2,280,186 | 4/1942 | Caldwell | 340/407 |
| 2,754,505 | 7/1956 | Kenyon | 340/407 |
| 3,725,665 | 4/1973 | Talmo | 250/231 SE |
| 3,746,988 | 7/1973 | Ford et al. | 250/231 SE |
| 3,750,130 | 7/1973 | Lute | 340/407 |
| 3,770,971 | 11/1973 | Somerset | 250/231 SE |
| 3,814,934 | 6/1974 | Mesh et al. | 324/175 |
| 3,866,120 | 2/1975 | Ford | 324/175 |
| 3,886,354 | 5/1975 | Swiden et al. | 324/175 |
| 4,158,172 | 6/1979 | Boyer et al. | 324/175 |
| 4,195,291 | 3/1980 | Burks | 324/175 |
| 4,334,217 | 6/1982 | Nield et al. | 212/153 |
| 4,342,028 | 7/1982 | Schroeder | 340/407 |
| 4,408,195 | 10/1983 | Tullis et al. | 212/153 |
| 4,468,617 | 8/1984 | Ringwall | 250/231 SE |
| 4,516,117 | 5/1985 | Couture et al. | 212/151 |

FOREIGN PATENT DOCUMENTS 2144091  2/1985  United Kingdom ................ 254/264

Primary Examiner—Sherman D. Basinger
Assistant Examiner—Thomas J. Brahan
Attorney, Agent, or Firm—L. B. Guernsey; R. B. Megley; R. C. Kamp

[57] ABSTRACT

A drum rotation indicator for indicating the speed of raising and lowering a load by a crane winch. A rate generator connected to the winch develops electrical pulses having a frequency proportional to winch rotational speed. A solenoid having a movable plunger is mounted in the cab of a crane where the vibration of the plunger can be sensed by a crane operator. Pulses from the rate generator are amplified and coupled to the solenoid to cause the plunger to vibrate at a rate corresponding to pulse frequency.

3 Claims, 2 Drawing Sheets

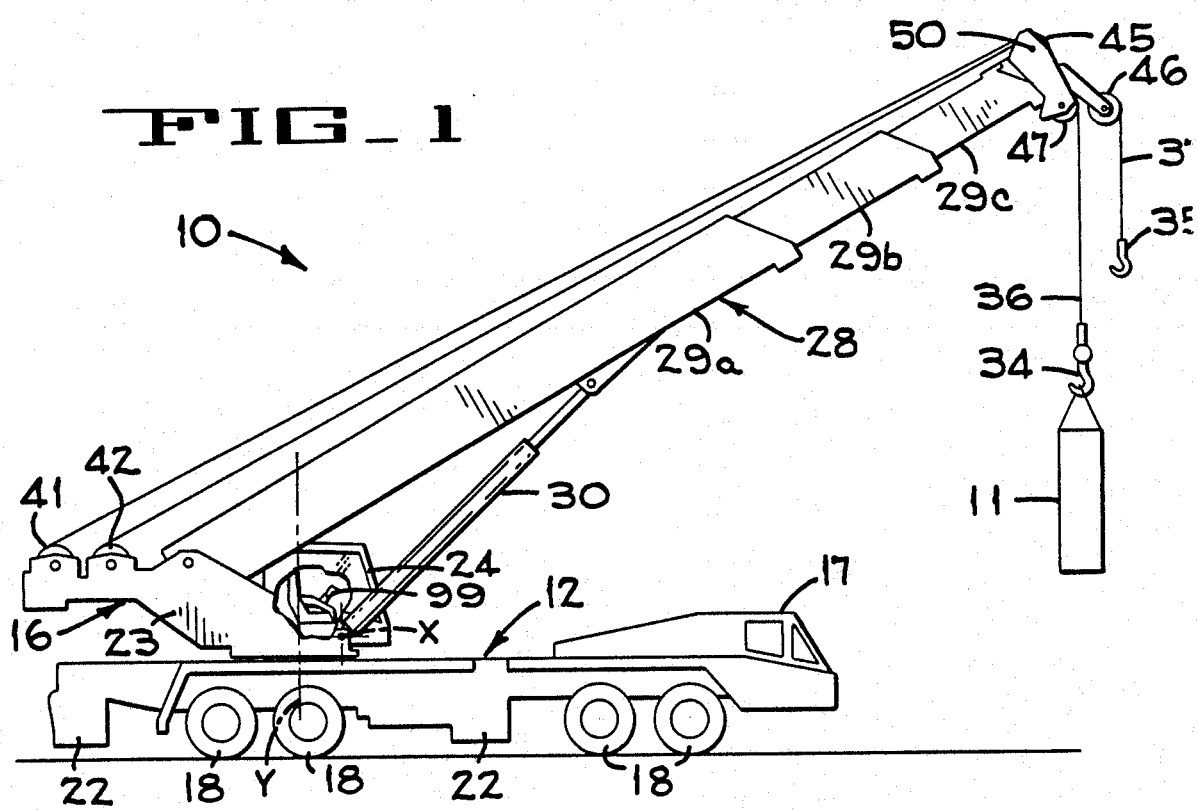
FIG_1
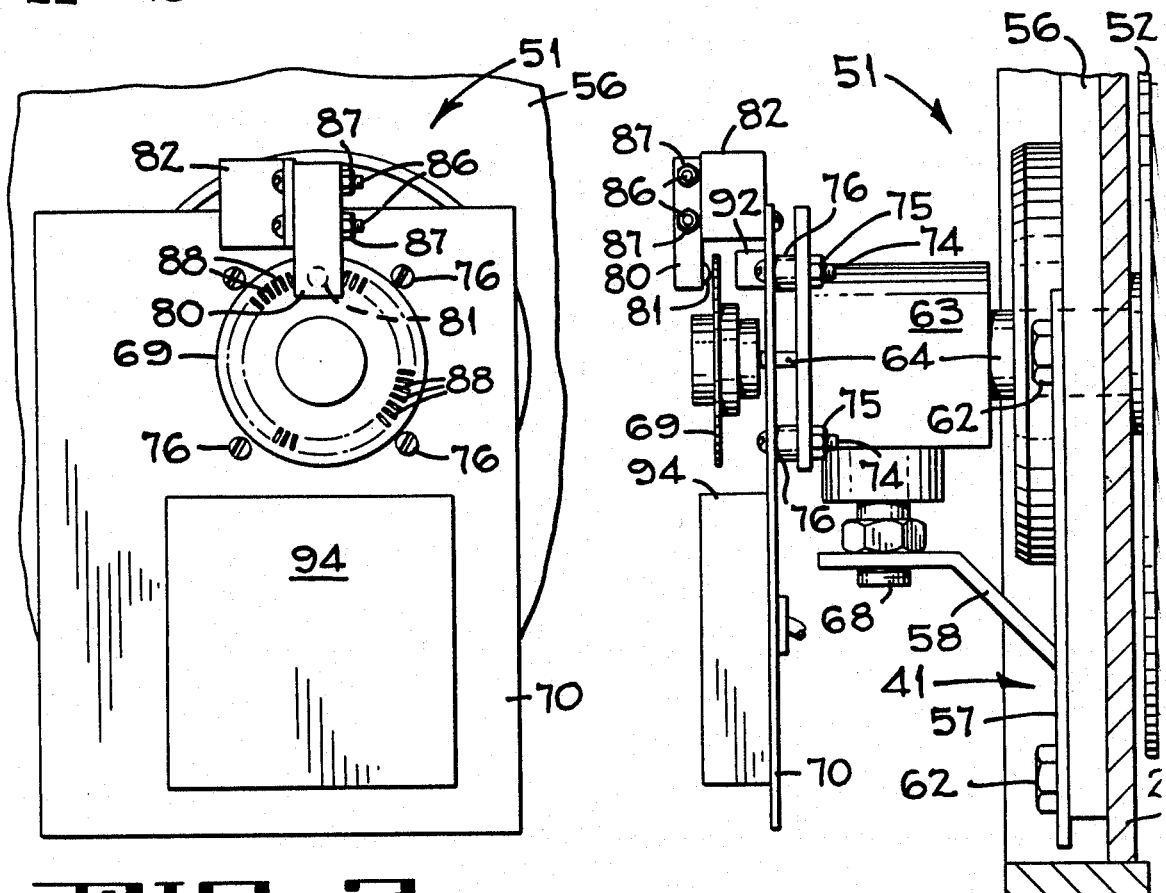
FIG_2
FIG_3

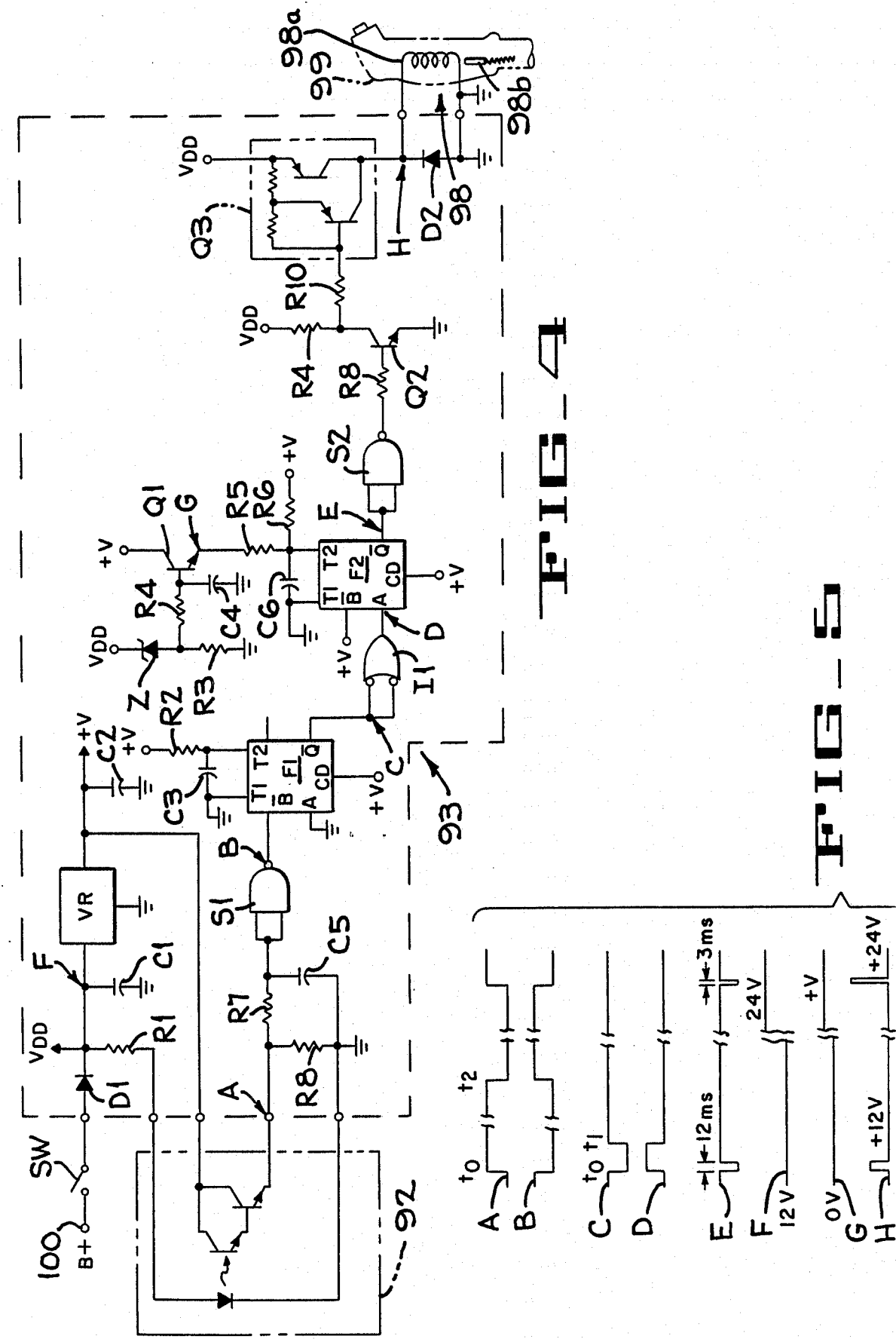

DRUM ROTATION INDICATOR

BACKGROUND OF THE INVENTION

The present invention relates to cranes, and more particularly, to apparatus for indicating the rate of raising or lowering a load by a winch system of a crane.

In the construction industry, a crane may comprise an extendible boom and upper structure mounted on a carrier or lower structure for movement from one job site to another. The boom and upper structure are pivotally mounted on the lower structure for selective rotational movement about a generally vertical axis to enable a crane boom to operate in a 360° area around the lower structure. A boom assembly is pivotally mounted on the upper structure for rotation in a vertical plane about a horizontal axis by elevating cylinders. A hook is connected to a winch system by a wire rope for raising and lowering loads.

A crane operator must observe and control the position of the cab, the height and position of the extendible boom, know the height and direction where a load is to be deposited, know the position where the load is to be positioned initially, and know the position of the load as it is raised and lowered. It is also important for the operator to know the speed of the load as the load is raised and lowered in order to position and control the load. It is difficult for an operator to see all of the above conditions and to raise and lower the load at a safe speed.

SUMMARY OF THE INVENTION

The present invention comprises a drum rotational indicator for indicating the speed of raising and lowering a load by a crane. The crane includes a winch with a drum that rotates to raise and lower the load. A rate generator connected to the drum develops a series of electrical pulses having a frequency proportional to the speed of rotation of the drum. A solenoid having a movable plunger is mounted in a cab of the crane where the movement of the plunger can be sensed by a crane operator. The rate generator is coupled to the solenoid to cause the plunger to vibrate at a rate corresponding to the frequency of the pulses from the rate generator.

One convenient place for mounting the solenoid is in the joy stick used to control operation of the load on the winch system. When the crane operator's hand is placed on the joy stick any vibration of the solenoid plunger can be felt by the operator. A lamp which blinks in response to the electrical pulses or an audio device which responds to the electrical pulses could be used to replace the solenoid.

A pulse forming circuit connected between the rate generator and the solenoid generates output pulses having a predetermined amplitude and time duration for operating the solenoid. The pulse forming circuit also includes a voltage sensing circuit which senses the value of the supply voltage and automatically regulates the amplitude and time duration of the output pulses so the solenoid receives the same amount of electrical drive for each of the battery voltages which may be used on a crane.

BRIEF DESCRIPTION OF THE DRAWINGS

FIG. 1 is a diagrammatic side elevation view of a truck crane having a drum rotation indicator according to the present invention.

FIG. 2 is a front view of an apparatus for developing electrical pulses as the drum of the winch rotates.

FIG. 3 is a side elevation of the pulse generating apparatus of FIG. 2.

FIG. 4 is a schematic diagram of an electrical circuit for use with the apparatus of FIG. 2 for providing electrical pulses to an electrical solenoid.

FIG. 5 illustrates electrical wave forms useful in explaining the operation of the electrical circuit of FIG. 4.

DESCRIPTION OF THE PREFERRED EMBODIMENT

Referring to FIG. 1 of the drawings, a crane 10 for handling loads 11 and for using the present invention to monitor the rate of raising and lowering the load 11 is shown. The crane 10 includes a carrier or lower works 12 supporting an upper structure 16. The carrier 12 may include a truck cab 17 mounted to the carrier and a plurality of support wheels 18 for moving and guiding the crane 10 along streets and roads. The wheels 18 also provide support for the crane while work is being performed and additional support and stability is provided by a plurality of outriggers 22 mounted on either side of the crane.

The upper structure 16 of the crane 10 includes a frame structure 23 having a crane cab 24 and a multi-section telescopic boom assembly 28 thereon. The telescoping boom assembly 28 comprises three boom sections 29a, 29b, 29c. The inner section 29a, which is not extendible, is pivotally mounted on the frame structure 23 for rotation in a vertical plane about a longitudinal axis X by an elevating cylinder 30. A pair of hooks 34, 35 are connected by a pair of wire ropes 36, 37 to a pair of winch systems 41, 42 for lifting one or more loads 11 in the usual manner. The wire ropes 36, 37 are threaded over a plurality of sheaves 45–47 which are rotatably mounted at an outer end of the boom 28. Only one sheave 45 is shown at the upper end of boom section 29c but it should be understood that there are two sheaves side-by-side rotatably mounted on a pin 50. The upper structure 16 (FIG. 1) is mounted for pivotal movement about a generally vertical axis Y powered by a reversible motor (not shown) in a manner well known in the art.

The drum rotation indicator of the present invention includes an optical switch assembly 51 (FIGS. 2, 3) coupled to a drum 52 of one of the winch systems 41, 42 (FIG. 1). Assembly 51 includes a plate 56, a vertical bracket 57 and an angle bracket 58 secured to the frame structure 23 by a plurality of bolts 62 (FIG. 3). A drive adapter 63 having a rotatable shaft 64 extending therethrough is secured to the angle bracket 58 by a bolt 68. The shaft 64 is connected to the drum 52 and to an encoder disc 69 (FIGS. 2, 3) so disc 69 rotates as drum 52 rotates. A plate 70 is connected to drive adapter 63 by a plurality of bolts 74, nuts 75 and spacers 76. A housing 80 having a light emitting diode (LED) 81 mounted thereon is secured to plate 70 by a bracket 82 and a plurality of bolts 86 and nuts 87 (FIGS. 2, 3). Light from LED 81 is projected, through a plurality of equally spaced slots 88 (FIG. 2) in disc 69, to a phototransistor sensor 92 (FIG. 3) mounted on plate 70. As disc 69 rotates, sensor 92 develops a series of pulses as light from LED 81 alternately falls on and is obscured from sensor 92. The frequency of the pulses from sensor 92 is proportional to the speed of rotation of disc 69 and drum 52. A pulse forming circuit 93 (FIG. 4) mounted in a metal housing 94 (FIGS. 2, 3) receives the pulses from sensor 92 (FIGS. 3, 4) and develops a drive signal for operating a solenoid 98 mounted in a handle 99 of a crane operator's joy stick (FIGS. 1, 4) in the crane cab 24 (FIG. 1). The solenoid 98 includes a coil 98a having a plunger 98b movably mounted in coil 98a.

The circuit 93 of FIG. 4 can use a standard crane battery voltage of either 12 volts or 24 volts and provide substantially the same amount of drive to solenoid 98 when either 12 volts or 24 volts is connected to a power input terminal 100 (FIG. 4). Signal pulses of waveform A (FIG. 5) developed by sensor 92 (FIG. 4) are filtered by an RC filter R7C5 to remove noise which may develop in the sensor 92. The filtered signal is applied to the input of a Schmitt trigger circuit S1 which provides a plurality of pulses (waveform B, FIG. 5) to a flip-flop F1. Flip-flop F1 develops narrow pulses (waveform C) having a time duration determined by the values of resistor R2 and capacitor C3. An inverter I1 provides pulses (waveform D, FIG. 5) to the input of flip-flop F2. When the frequency of the waveforms A, B, (FIG. 5) is below a predetermined value the time duration between $t_o$ and $t_2$ is greater than the time duration between time $t_o$ and $t_1$ (waveform C) of the signal from flip-flop F1. This allows flip-flop F1 to go through a complete cycle (waveform C) from a high value of output signal, to a lower value and return to a high value. Flip-flip F1 developes a series of negative pulses which drive the solenoid 98. When the frequency of waveforms A, B increases, so the pulse from phototransistor sensor 92 (between times $t_o$ and $t_2$) is less than the time duration determined R2 and C3 the output (waveform C) of flip-flop F1 is low at the time the input signal to F1 (waveform B) goes negative. As a result flip-flop F1 will not be triggered by the signal of waveform B. The RC time constant R2C2 determines the width of the negative pulse (waveform C) and limits the upper operating frequency of the circuit 93 of FIG. 4.

Transistor Q1, Zener diode Z and flip-flop F2 combine to provide a trigger pulse to trigger S2, and transistors Q2, Q3. The time duration of the trigger pulse to trigger S2 is determined by the amplitude of the supply voltage VDD. When VDD has a value of 12 volts Zener diode Z is nonconductive causing Q1 to be cut off so that the RC time constant at terminal T2 of flip-flop F2 is determined by resistor R6 and capacitor C6. As a result the output pulse (waveform E, FIG. 5) has a time duration of 12 ms. Transistor Q2 and power output circuit Q3 provide a current pulse of 12 ms duration to solenoid coil 98a pulling plunger 98b into coil 98a.

When supply voltage VDD has a value of 24 volts Zener diode Z and transistor Q1 are rendered conductive so the RC time constant at terminal T2 of flip-flop F2 is determined by R5 and R6 in parallel, combined with capacitor C6. This RC combination produces an output pulse of 3 ms time duration to Schmidt trigger S2. When Q2 and Q3 are rendered conductive the current from the 24 volt VDD through power circuit Q3 provides a large value of current to solenoid coil 98a for 3 ms. The 24 volt pulse for 3 ms provides substantially the same drive to plunger 98b as the 12 ms pulse provides when supply voltage VDD is 12 volts. One Zener diode Z which can be used in the circuit of FIG. 4 is the 1N4745 which is made by several manufactures. The breakdown voltage of the IN4745 is 16 volts so Z and Q1 are both rendered conductive when voltage VDD is greater than +16 volts. One Schmitt trigger S1, S2, which can be used in Model 4093 made by Motorola Corporation, Phoenix, Ariz.

Although the best mode contemplated for carrying out the present invention has been herein shown and described, it will be apparent that modification and variation may be made without departing from what is regarded to be the subject matter of the invention.

What is claimed is:

1. A drum rotation indicator for indicating the speed of raising and lowering a load by a rotatable winch drum mounted on a crane, said indicator being adapted for use with a plurality of standard electrical battery voltages used in crane batteries, said crane including a battery, said indicator comprising:

a switch assembly coupled to said winch drum for developing signals having a frequency proportional to the rate of rotation of said winch drum, a pulse forming circuit coupled to said switch assembly for receiving said signals and for developing output pulses having a frequency proportional to the frequency of said signals;

means for coupling said pulse forming circuit to a crane battery for operating said pulse forming circuit;

a solenoid having a movable plunger;

means for coupling said pulse forming circuit to said solenoid to operate said plunger in response to said output pulses; and a voltage sensing circuit coupled to said crane battery and to said pulse forming circuit, said sensing circuit including means for sensing the value of said crane battery voltage and adjusting the time duration of said output pulses according to the value of said crane battery voltage to provide a predetermined value of electrical drive to said solenoid for a variety of crane battery voltages.

2. A drum rotation indicator as defined in claim 1 wherein said means for coupling said pulse forming circuit to said solenoid includes a power circuit connected between said solenoid and said electrical source, said power circuit providing electrical drive to said solenoid in response to said output pulses.

3. A drum rotation indicator as defined in claim 1 wherein said switch assembly includes a slotted disc connected to rotate with said drum, an optical switch fixed mounted adjacent said slotted disc and a light source fixed mounted to direct light through a series of slots in said disc to said optical switch.

* * * * *